Patented Sept. 4, 1934

1,972,719

UNITED STATES PATENT OFFICE

1,972,719

OPERATING MECHANISM FOR MACHINES

Kenneth P. Swanson, East Orange, and Charles Eisler, South Orange, N. J., assignors to Eisler Engineering Co., Newark, N. J.

Application May 19, 1932, Serial No. 612,224

5 Claims. (Cl. 219—4)

This invention relates to an improved mechanism for operating a machine by a succession of individual pressures or by a series of succession of movement while a continuous pressure is applied to an actuating means.

The invention is applicable to various kinds of machines but we illustrate and describe the invention as applied to an electric welding machine.

The object of the invention is to provide a simple easily operated mechanism that can be quickly changed from a single stroke to a multiple stroke adjustment. By this means a piece of welding work can be treated to various forms of operation without the necessity of removing the work from the machine.

The particular form of machine on which we illustrate the mechanism is of the type shown and described in the application of Charles Eisler, filed April 7, 1932, Ser. No. 603,820.

Figure 1:
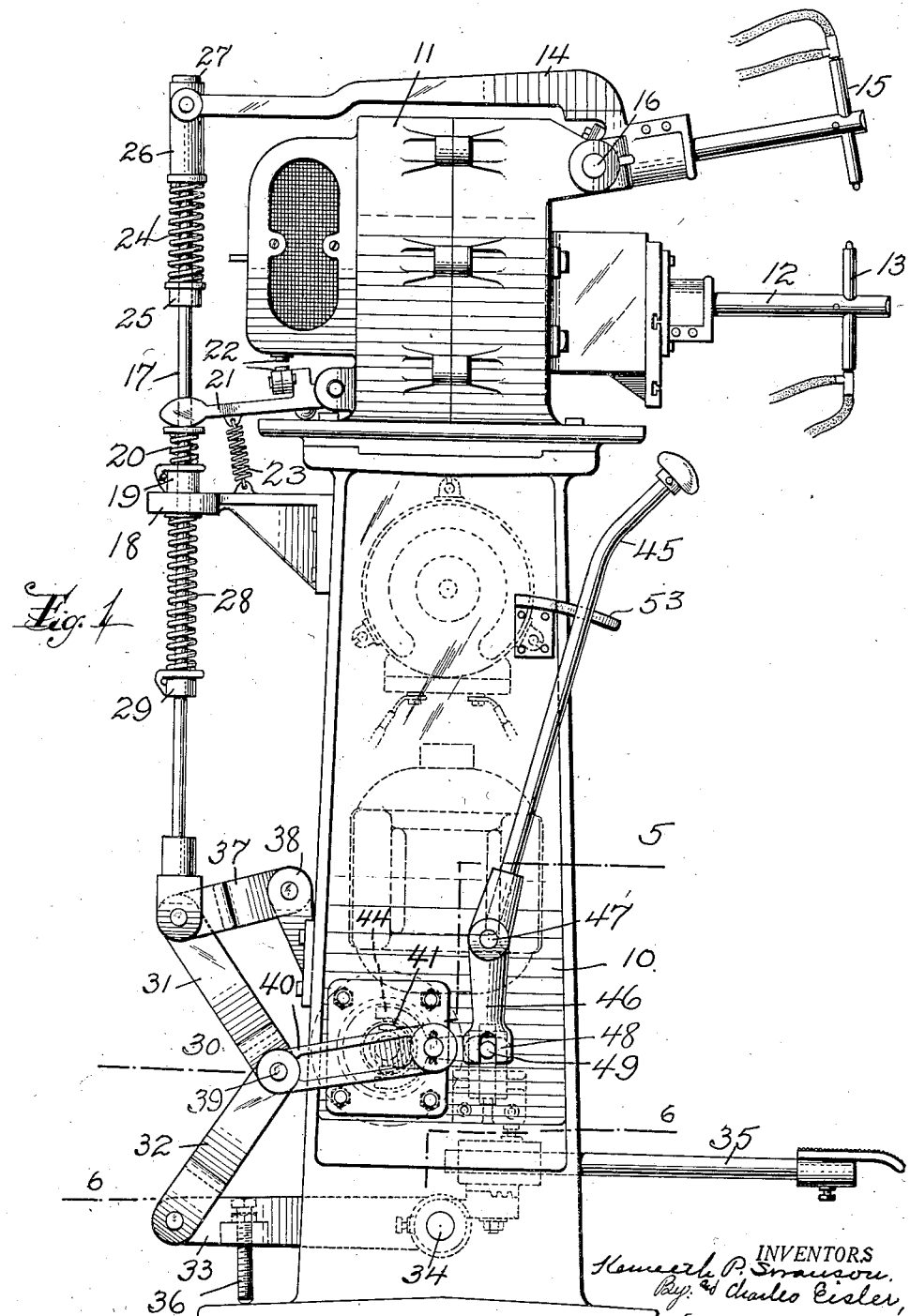
Figure 2:
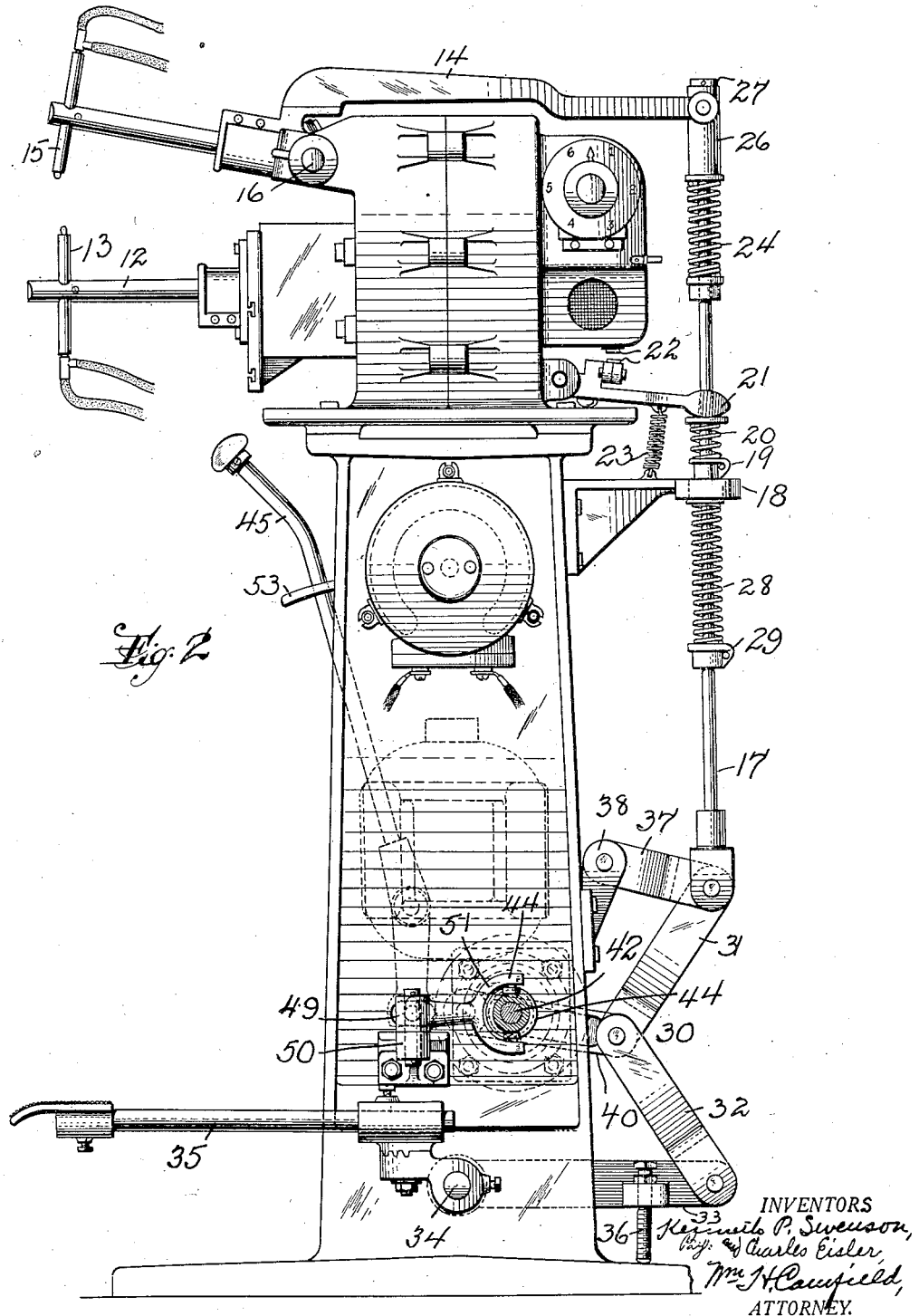
Figure 3:
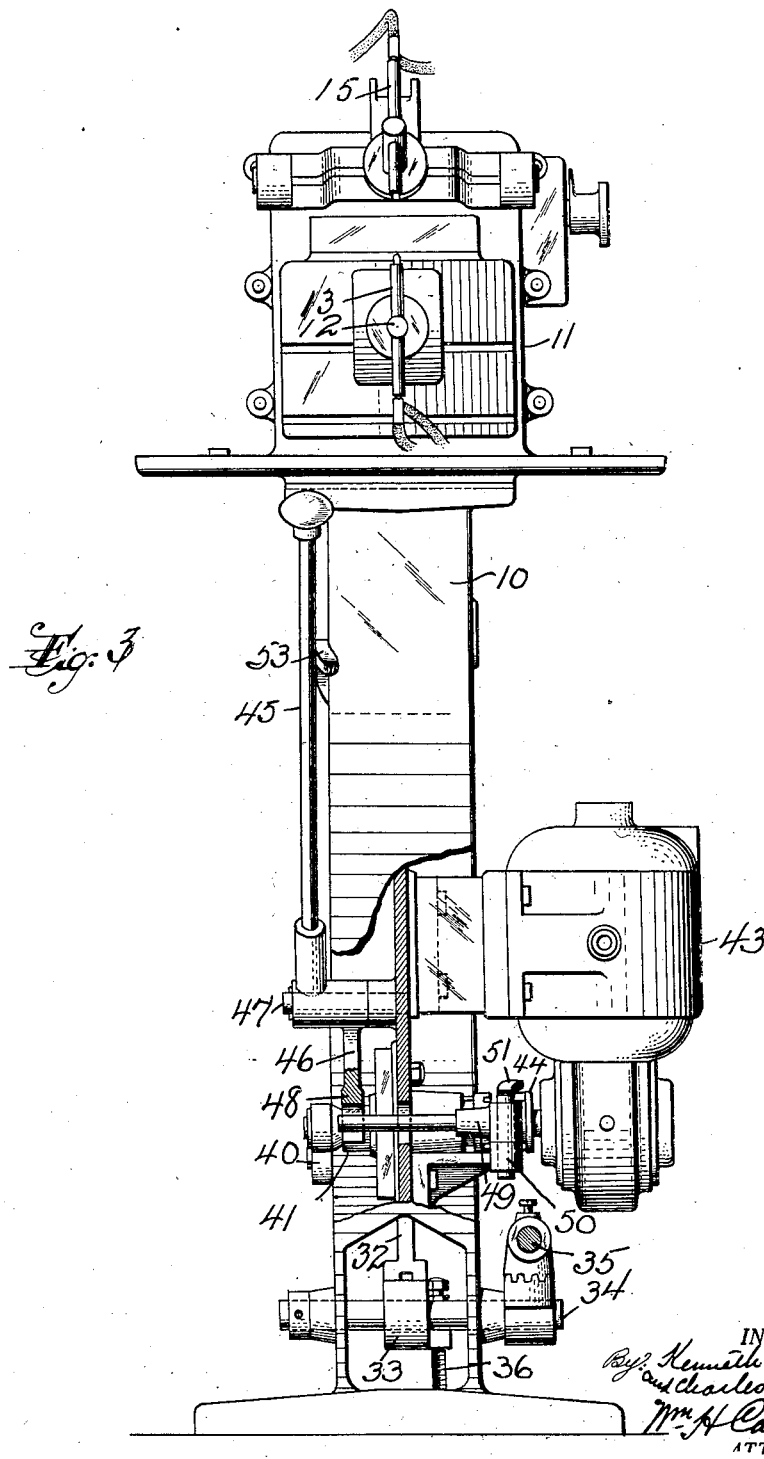
Figure 4:
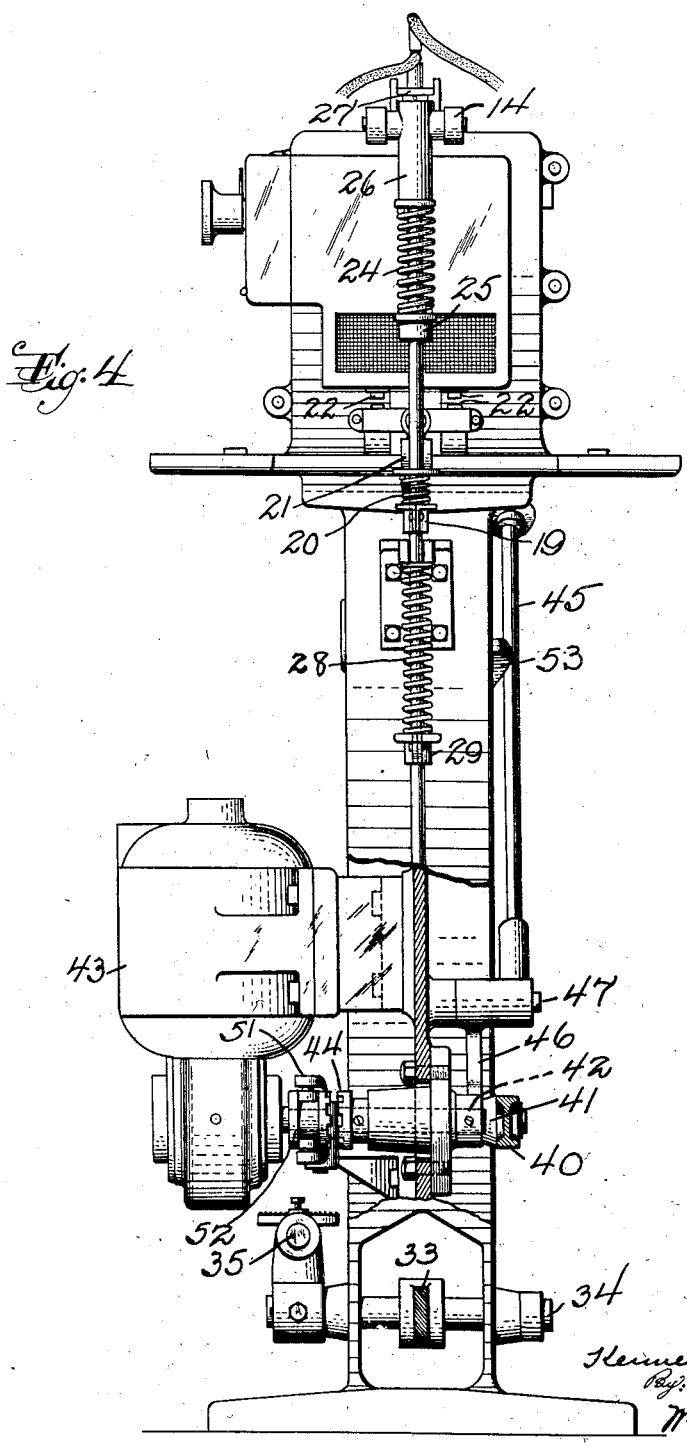
Figure 5:
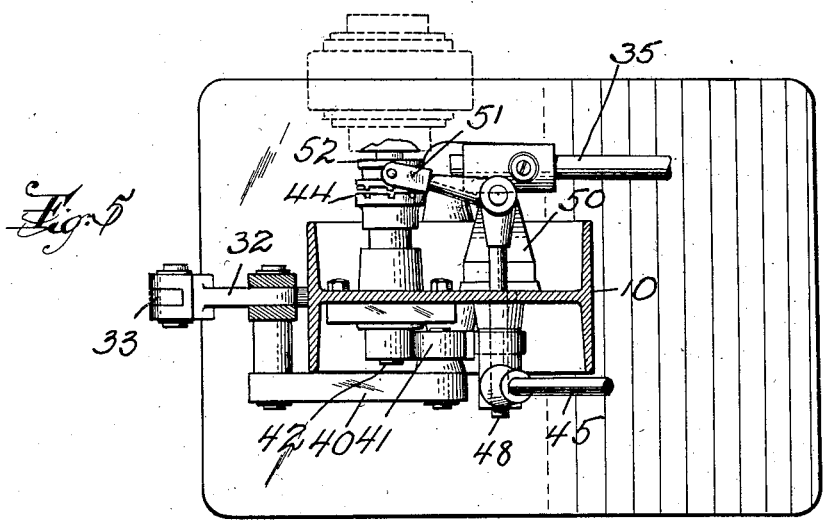
Figure 6:
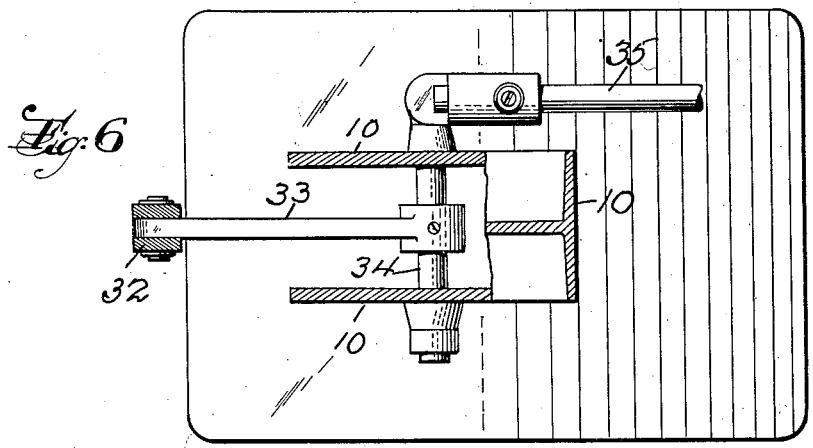

The invention is illustrated in the accompanying drawings in which Figure 1 is an elevation showing the left side of a machine embodying our invention. Figure 2 is a view of the right side of the machine shown in Figure 1. Figure 3 is a front elevation of the machine showing the lower part in section. Figure 4 is a rear view of the machine with the lower part in section. Figure 5 is a horizontal section on line 5—5 in Figure 1 and Figure 6 is a horizontal section on line 6—6 in Figure 1.

The invention comprises a manually operated means for making individual contacts of the contacts of a welding machine, and a motor driven mechanism for the same contacts which latter mechanism causes periodic and repeated contacts and a shift mechanism out of operative position.

The motor operated mechanism serves in part to function as a fulcrum or base for the manually operated means and inoperative also when the motor driven means is in operation.

The machine is preferably supported by a column 10 which is provided at the top with a housing 11 containing the switch mechanism for the source of electrical power and which is not shown in this application. The housing also supports a fixed arm 12 with its electrode 13 and a lever 14 with the movable electrode 15. The lever is shown pivoted at 16 and is hinged at the back end to the rod 17.

The rod 17 is guided in a bearing 18 and acts, by the collar 19, spring 20, and switch lever 21, to cause the contacts 22 to be brought together in order to put the electrodes in circuit when they are in contact or in welding position. A spring 23 causes the return of the switch lever when the rod 17 descends. The rod 17 operates the lever 14 through the medium of the spring 24 which abuts on a collar 25 and a yoke 26 pivoted to the lever 14. The rod 17 slides freely through the yoke 26 and has a collar 27 at the top to limit the downward movement of the rod relative to the yoke. This construction provides a lost motion which prevents excess destructive pressure by the electrode 15 on the electrode 13. The upward movement of the rod 17 is against a spring 28 abutting on the bearing 18 and on a collar 29 on the rod 17. This spring 28 insures the return of the rod 17 to normal position.

The bottom of the rod 17 is pivotally connected to the top end of the top bar of the toggle-joint 30 which consists of a top bar 31 and a bottom bar 32. The bottom bar 32 is pivoted to a lower arm 33 hinged to a stub shaft 34 which is provided with a foot lever 35 for operating it. The stub shaft is rotatably mounted in the column 10 and rests on the base of the machine through the medium of a stop which is preferably an adjustable one as the screw 36.

The juncture of the top bar 31 of the toggle-joint and the rod 17 also includes a joint with the top lever 57 secured at the other end to the fixed pivotal support 38 on the column 10.

The knee of the toggle-joint is hinged as at 39 to the link 40 which connects the knee with the end of a crank 41 on the shaft 42. The shaft 42 is driven from the motor 43 and can be connected or disconnected by the clutch 44. The clutch is operated from the hand lever 45. The hand lever has an extension 46 beyond its pivotal support 47 which extension has a fork 48 in which is the end of a cross rod 49 pivoted on a bracket 50. The cross rod is part of a bell-crank with the end 51 formed to engage the movable member 52 of the clutch 44. When the clutch is disconnected the shaft 42 is idle and this allows the toggle-joint to force the link 40 and the crank 41 to the position shown in Figure 1.

The handle 45 is capable of side movement enough to pass it over the stop 53 to hold it back in the position it occupies when the clutch 44 is thrown in. The resiliency of the metal in the handle is utilized to hold it in place and to allow it to ride over the stop 53.

In operating the machine as a single operation device the clutch is thrown out as shown in Figure 5. The foot pedal is pushed down for each operation. As the treadle is pushed down it raises the lower arm 33 secured to the stub shaft 34 and this raises the toggle as a whole. The toggle swings on the upper lever 37 and the link 40 and raises the rod 17 to push the lever or arm 14 to lower the electrode 15. On the release of the treadle by the foot the rod 17 and the toggle descend and raise the electrode 15.

When the device is used in a staccato or in a repetitious manner the clutch 44 is thrown in. This rotates the shaft 42 and the crank 41, the toggle-joint is pushed in and out against the lower arm 33 and thus reciprocates the rod 17. In this manner the arm 33 as part of the manually operable means acts as a means for sustaining the toggle joint while it is operating.

Various changes can be made in the form and proportions of the parts without departing from the scope of the invention.

We claim:—

1. A machine comprising a rod, a manually operable mechanism, a power operated mechanism for operating the rod upon dis-connection of said manually operated mechanism, said power operated mechanism having a part interposed in the manually operable mechanism whereby the latter functions as a base for the power operating mechanism.

2. A machine comprising a rod, a toggle-joint secured at one end to the rod, a treadle with a connection to the other end of the toggle-joint, a link hingedly connecting the upper end of the toggle-joint to a fixed support and a power operated mechanism including a reciprocable link connected to the knee of the toggle-joint.

3. A machine comprising a rod, a toggle-joint secured at one end to the rod, a treadle with a connection to the other end of the toggle-joint, a link hingedly connecting the upper end of the toggle-joint to a fixed support, a power operated mechanism including a shaft, a crank, and a link connecting the crank with the knee of the toggle-joint.

4. A machine comprising a rod, a toggle-joint secured at one end to the rod, a treadle with a connection to the other end of the toggle-joint for manual operation, a link hingedly connecting the upper end of the toggle-joint to a fixed support and a power operated mechanism having a clutch embodied therein to enable the link and toggle joint to assume an idle position when the manually operable mechanism is operated.

5. A mechanism for machines comprising a standard a manually operable bottom lever, a toggle-joint with its bottom end hinged to the lever, a top lever hingedly connecting the top of the toggle-joint to the standard, a shaft, a crank on the shaft, a link connecting the crank and the knee of the toggle-joint, a motor, a clutch between the shaft and the motor, the bottom lever resting on a support when inoperative to form a base for the operation of the toggle-joint, the link and crank acting as means preventing the spreading of the toggle-joint when the bottom lever is operated.

KENNETH P. SWANSON.
CHAS. EISLER.